United States Patent
Barragan

(10) Patent No.: US 7,786,377 B2
(45) Date of Patent: Aug. 31, 2010

(54) DEVICE TO ATTENUATE ATMOSPHERIC DISCHARGES

(75) Inventor: Humberto Arenas Barragan, Bogota (CO)

(73) Assignee: John J. Martinez, Croton on Hudson, NY (US)

( * ) Notice: Subject to any disclaimer, the term of this patent is extended or adjusted under 35 U.S.C. 154(b) by 268 days.

(21) Appl. No.: 12/128,275

(22) Filed: May 28, 2008

(65) Prior Publication Data

US 2009/0000802 A1 Jan. 1, 2009

(51) Int. Cl.
*H02G 13/00* (2006.01)
(52) U.S. Cl. ............... 174/3; 174/5 R; 174/6; 174/2; 174/7; 174/5 SG; 361/117
(58) Field of Classification Search ....... 174/2, 174/3, 5 R, 6, 7, 5 SG; 361/117
See application file for complete search history.

(56) References Cited

U.S. PATENT DOCUMENTS

| | | | | |
|---|---|---|---|---|
| 4,652,694 A | * | 3/1987 | Goldman et al. | 174/3 |
| 4,752,854 A | * | 6/1988 | Lefort et al. | 361/117 |
| 5,998,731 A | * | 12/1999 | Takamura | 174/3 |
| 6,069,314 A | * | 5/2000 | Varela | 174/3 |
| 6,677,517 B2 | * | 1/2004 | Fowler et al. | 174/3 |
| 6,875,915 B1 | * | 4/2005 | Chung | 174/3 |
| 7,495,168 B2 | * | 2/2009 | Park | 174/7 |
| 7,593,206 B2 | * | 9/2009 | Schulte | 361/117 |

* cited by examiner

*Primary Examiner*—Dhiru R Patel
(74) *Attorney, Agent, or Firm*—John J. Martinez; Martinez Patents P.C.

(57) ABSTRACT

The invention of the present application provides a device that includes an assembly of a toroid and a rod with one or several pointed ends; and a filter system; wherein, around the pointed end or the pointed ends of the rod, an electrical field is formed with air ionization, wherein in the space around the toroid formation of electrical fields and air ionization are minimized, wherein the pointed end projects out above the toroid level, and wherein the filter system attenuates the electrical discharge of lightning rays. The device of the present invention is connected to a low resistance cable that goes to ground.

6 Claims, 6 Drawing Sheets

DEVICE TO ATTENUATE ATMOSPHERIC DISCHARGES

FIELD OF THE INVENTION

The device of the present invention is related to the attraction, discharge, channeling, attenuation and dissipation of lightning rays produced by atmospheric discharges.

BACKGROUND OF THE INVENTION

Lightning rays are a constant threat for buildings, cellular antennas, and many other structures, to which great damage is caused, due to high electrical currents that they carry.

At the end of the eighteen century, Benjamin Franklin invented the lightning rod to attract the atmospheric discharges to ground, thus protecting, buildings and high structures from the damage caused by lightning rays. The lightning rod is characterized by a metallic rod sharpened at the superior end. The lightning rod is connected to a low resistance cable that goes to ground, thus dissipating an electrical discharge. In the field of the invention, the principal supposition is that the lightning ray is preferentially attracted by the lightning rod because an electrical field is formed with air ionization in the space around the lightning rod.

In 1918, Nikola Tesla described an invention in the U.S. Pat. No. 1,266,175 that is characterized by a rod which ends with blunt extensions that irradiate from the superior extreme of the rod, wherein said blunt extensions have a curvature that orientates the termination of each extension downward. According to Tesla, said invention prevents an attraction, departure, or electrical discharge from the atmosphere. Tesla explained, in the description of his patent, that the Franklin's sharpened rod, when ionizing air, augments attraction to lightning rays. In contrast, Tesla says that his invention prevents the electrical discharges because the downward oriented blunt terminations avoid formation of electrical fields and air ionization, thus minimizing, attraction to lightning rays. Tesla mentions that even in case of a lightning ray is attracted by the rod with blunt extensions, said rod is connected by means of a cable to ground, thus, dissipating the electrical discharge.

This patent application describes a new invention that conciliates the principles that have been assumed with respect to the Franklin's sharpened rod, with the theory that Tesla describes to explain how his rod with blunt extensions protects against lightning rays. Furthermore, the invention of this application describes an element that attenuates the electrical discharge.

SUMMARY OF THE INVENTION

The invention of the present application provides a device that comprises an assembly of a toroid and a rod with one or several pointed ends; and a filter system; wherein, around the pointed end or the pointed ends of the rod, an electrical field is formed with air ionization, wherein in the space around the toroid formation of electrical fields and air ionization are minimized, wherein the pointed end projects out above the toroid level, and wherein the filter system attenuates the electrical discharge of lightning rays. The device of the present invention is connected to a low resistance cable that goes to ground.

Specifically, the present invention provides a device to attract, attenuate and dissipate electrical discharges, wherein the device is characterized by:

A. An assembly that comprises: A1) a vertical rod, wherein the rod in its superior extreme is pointed; and A2) a circular toroid that is connected by radial extensions to the rod;

B. An isolator that supports the inferior extreme of the rod of the assembly; and C. A filter system for the electrical discharge, wherein said system comprises at least two elements, wherein each one of the elements is joined to the isolator, wherein the elements are placed successively from a superior level to an inferior level, wherein a first elements is the most superior, wherein the first element is connected directly to the assembly rod;

wherein between two successive elements of the filter system, when there is an electrical discharge, a plasma effect is induced due to ionization of molecules of gases in air, wherein the most inferior element of the filter system is connected to ground by mean of a cable.

In other embodiment of the present invention, the assembly comprises A1) a vertical rod; A2) a disperser with multiple pointed ends on the superior extreme of the vertical rod; and A3) a circular toroid that is connected by radial extensions to the rod.

In one more aspect of the present invention the assembly is characterized by the rod, wherein the rod is energized by an energy source, wherein the energy source is an electrical line.

In other embodiment of the present invention, the assembly is characterized by the rod, wherein the rod is energized by an energy source, wherein the energy source is an elevator transformator.

In other aspect of the present invention, the filter system for the electrical discharge is characterized by at least two elements, wherein each of the elements is joined to an isolator, wherein the elements are located vertically and successively from a superior level to an inferior level, wherein a first elements is the most superior, wherein the first element is connected directly to the assembly rod.

In another embodiment of the present invention, the filter system for the electrical discharge is characterized by at least two elements, wherein each one of the elements is joined to the isolator, wherein the elements are located successively in spiral from a superior level to an inferior level, wherein a first element is the most superior, wherein the first element is connected directly to the assembly rod.

Additional objectives and advantages of the present invention will be more evident in the description of the figures, the detailed description of the invention and the claims.

DETAILED DESCRIPTION OF THE INVENTION

Figure 1:
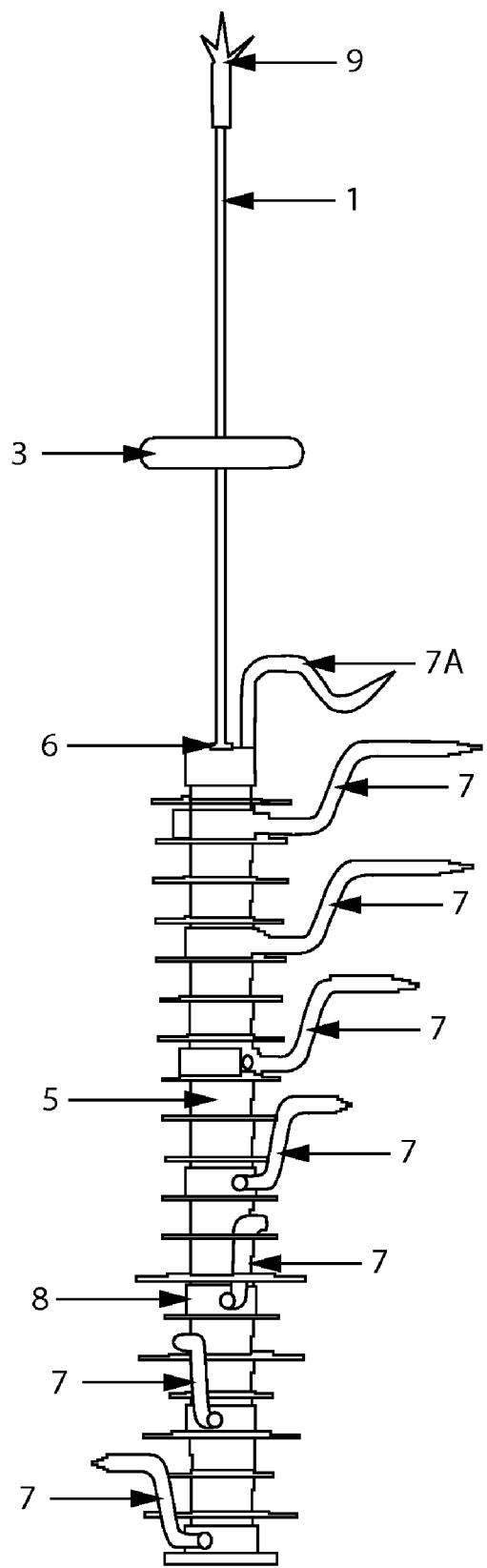
FIG. 1 shows a bi-dimensional view of one of the embodiments of the device of the present invention.
Figure 2:
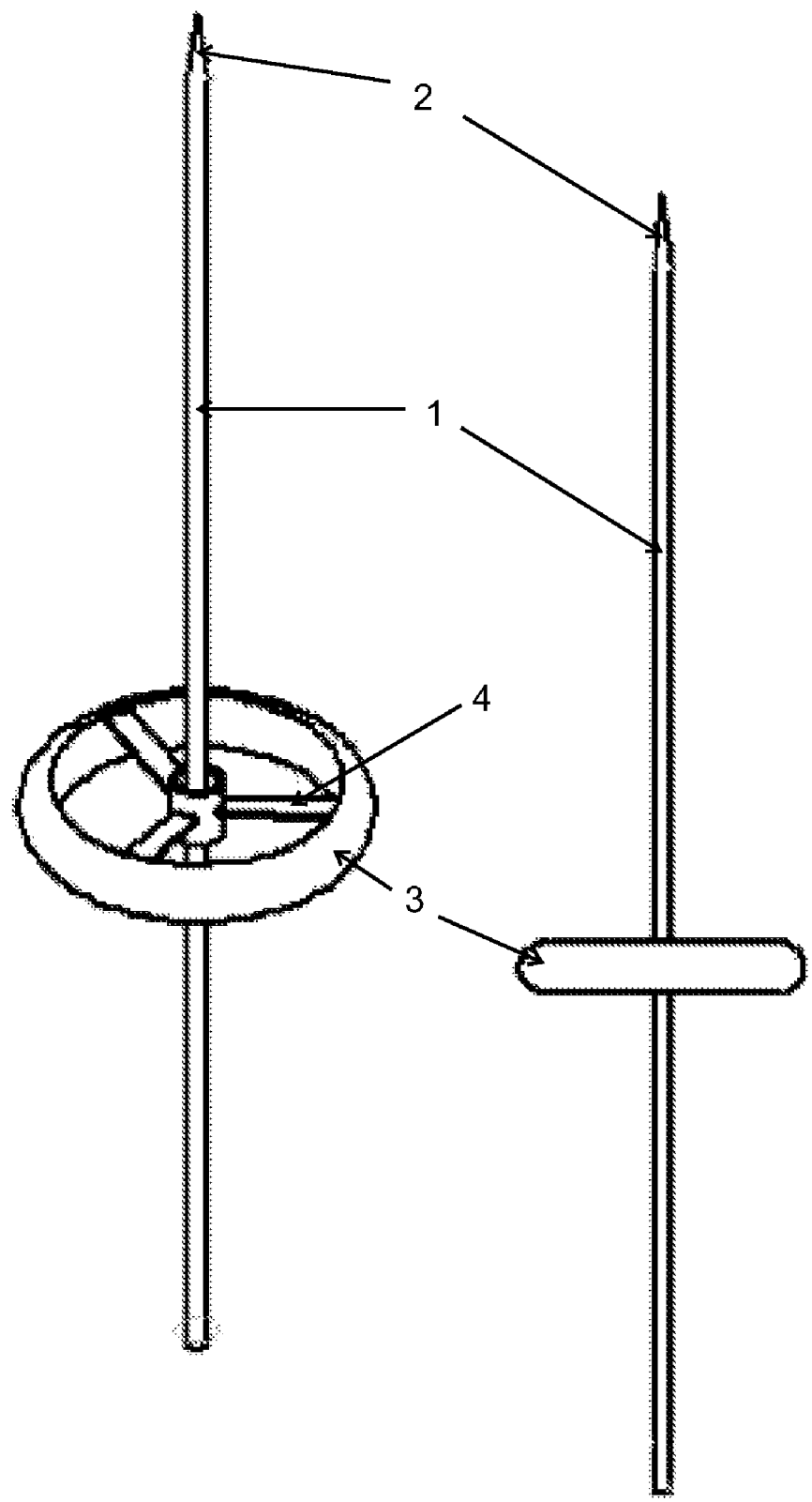
FIG. 2 shows a bi-dimensional view of one of the embodiments of the assembly of the device of the present invention.
Figure 4:
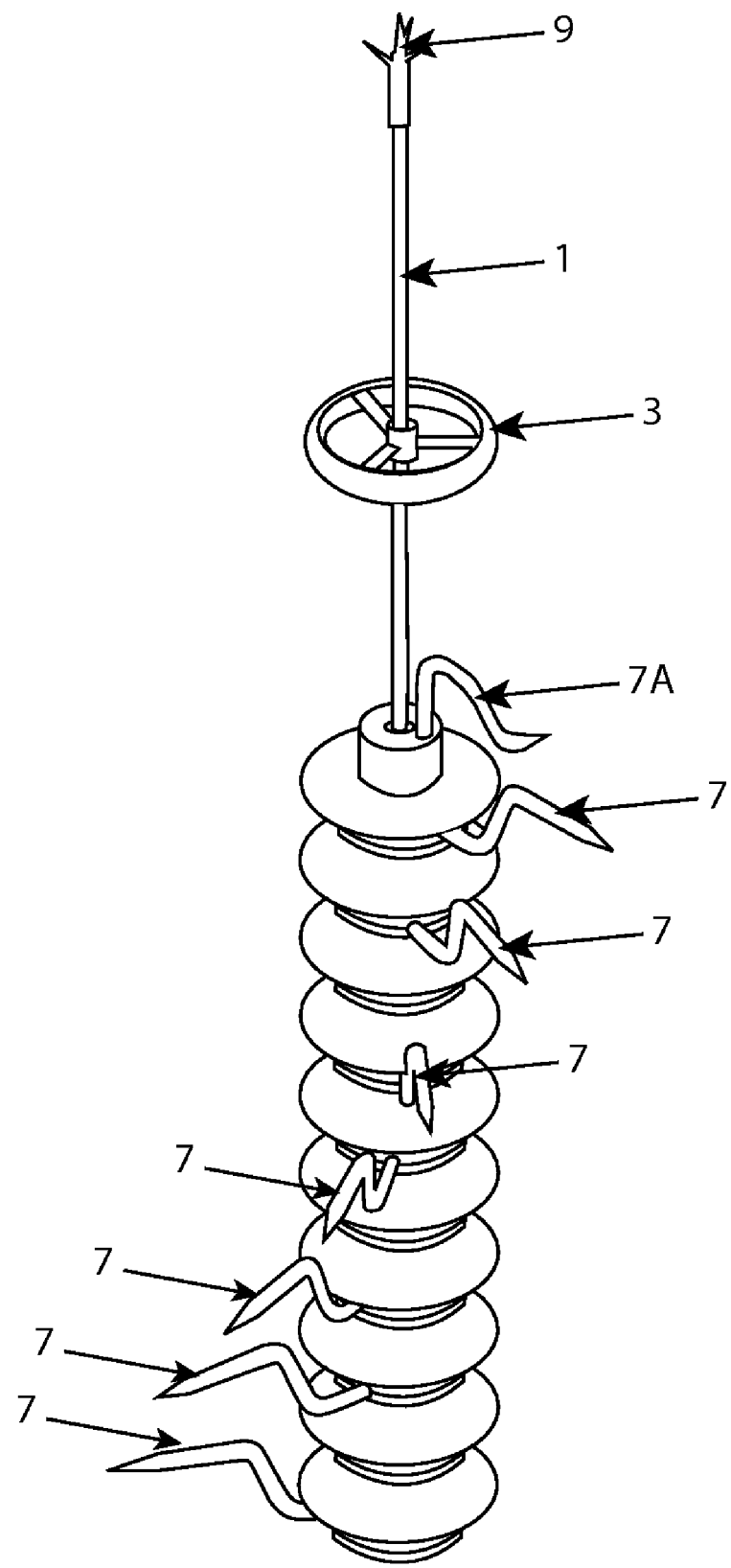
FIG. 4 shows a tri-dimensional view of one of the embodiments of the device of the present invention.
Figure 5:
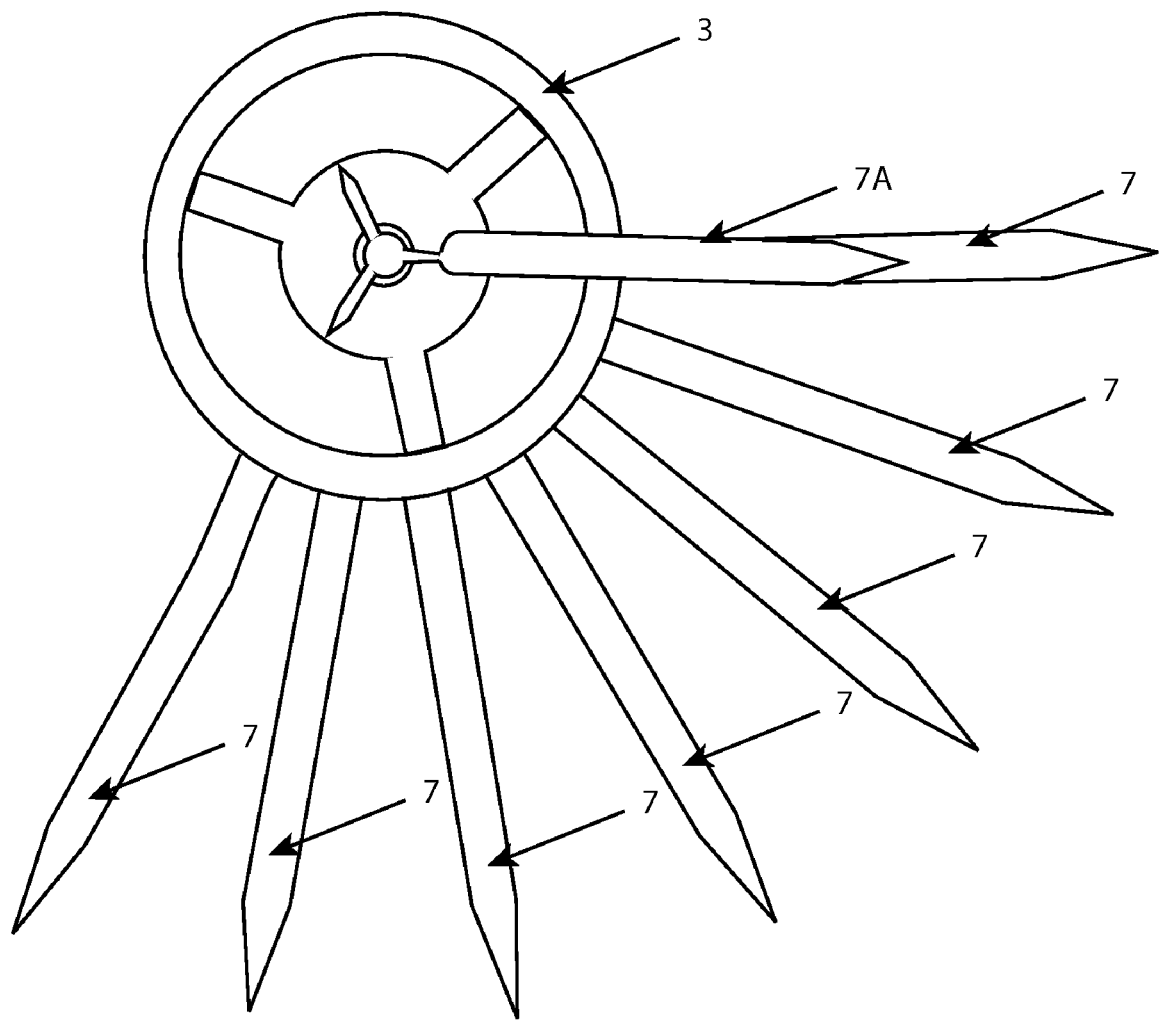
FIG. 5 shows a bi-dimensional view from a superior plane of one of the embodiments of the device of the present invention.
Figure 6:
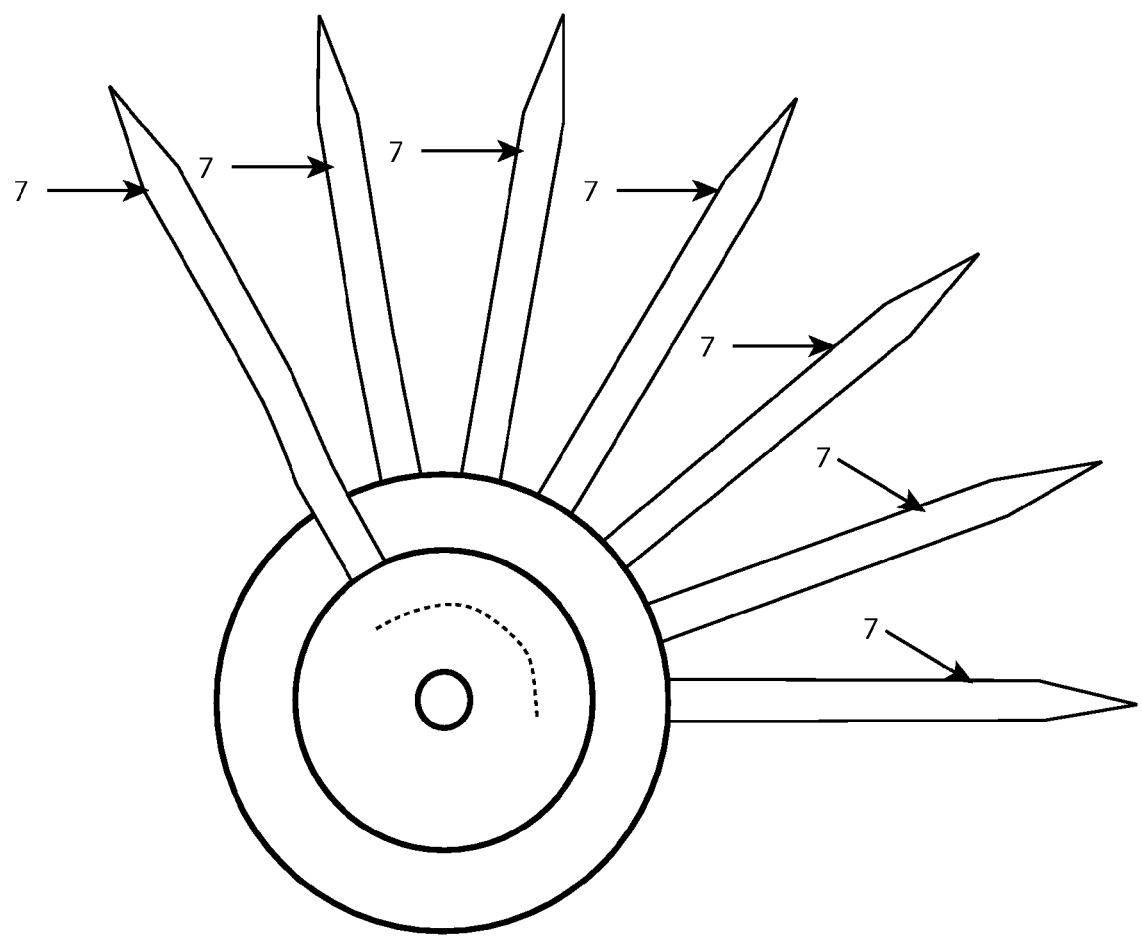
FIG. 6 shows a bi-dimensional view from an inferior plane of one of the embodiments of the device of the present invention.

FIG. 1 shows the most preferred embodiment of the device of the present invention, wherein the device is characterized by:

A. An assembly (FIG. 2) that comprises: a vertical rod (1), wherein the rod in its superior extreme (2) is pointed; and a circular toroid (3) that is connected by radial extensions (4) to the rod;

B. An isolator (5) (FIG. 1) that supports the inferior extreme (6) of the rod (1) of the assembly; and C. A filter system for an electrical discharge, wherein said system comprises at least two elements (7A y 7) (FIGS. 1, 4-6), wherein each one of the elements (7) is joined to the isolator (5) preferably with a bracket (8) (FIG. 1) or using other joint mechanisms, wherein the elements (7) are located successively from a superior level to an inferior level, wherein a first element (7A) (FIG. 1, 4 Y 5) is the most superior, wherein the first elements (7A) FIG. 4 Y 5) is directly connected to the rod (1) of the assembly; wherein between two successive elements (7) of the filter system, when there is an electrical discharge, a plasma effect is induced due to ionization of molecules of gases in air, and wherein the most inferior element of the filter system is connected to ground by mean of a cable, and wherein said ground has been adapted to dissipate the electrical discharge.

Figure 3:
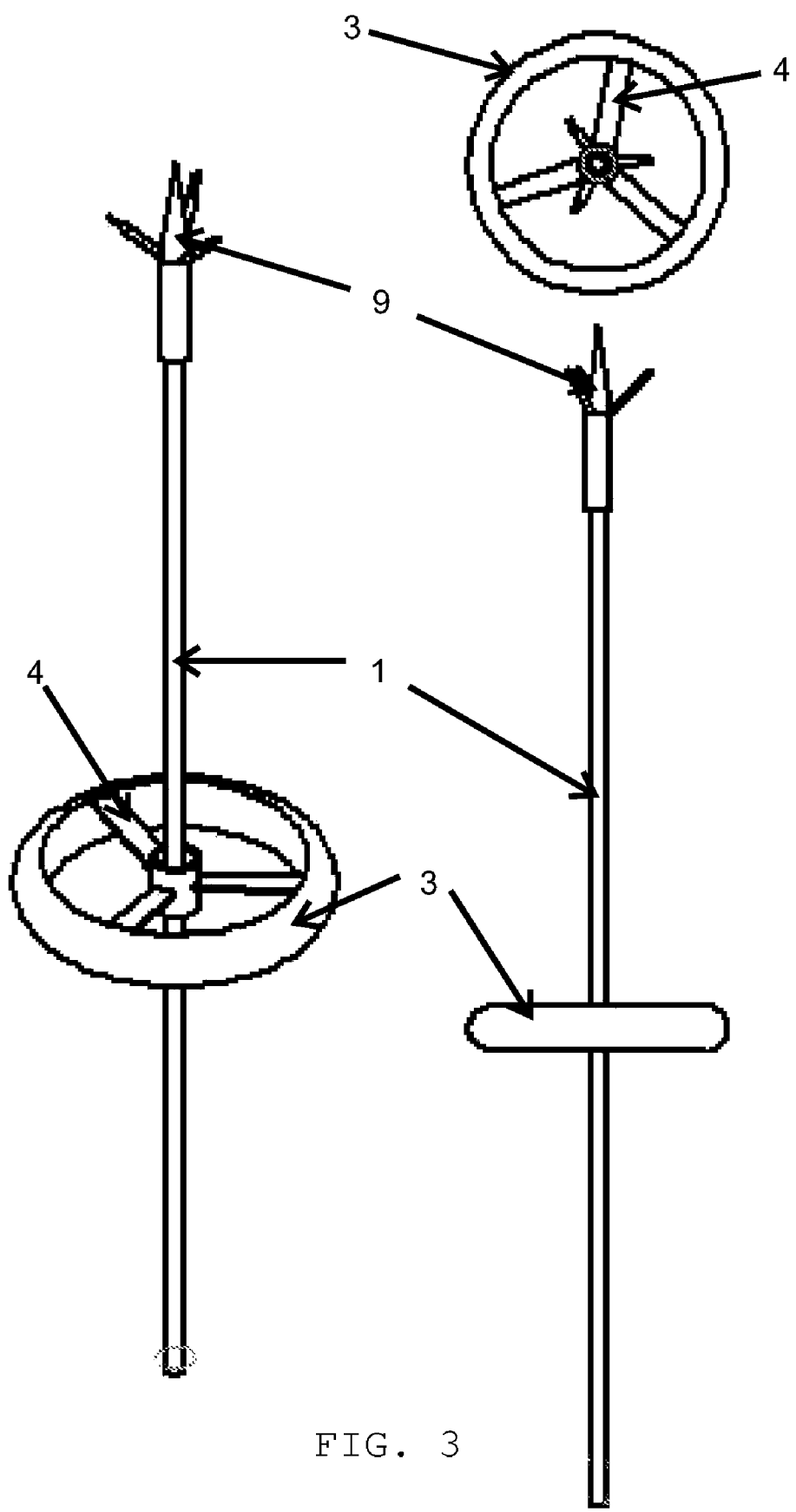
FIG. 3 shows a bi-dimensional view of one of the embodiments of the assembly of the device of the present invention.

In another embodiment of the present invention, the assembly comprises a vertical rod (1); a disperser with multiple pointed ends (9) (FIGS. 1, 3, 4) at the superior extreme of the vertical rod (1); and a circular toroid (3) that is connected by radial extensions (4) to the rod (1).

In another aspect of the present invention, the assembly is characterized by a rod (1), wherein the rod (1) is energized by an energy source, wherein an energy source is an electrical line.

In another embodiment of the present invention, the assembly is characterized by a rod (1), wherein the rod (1) is energized by an energy source, wherein the energy source is an elevator transformator.

Assuming the most accepted disposition in the field of the invention, the most preferred embodiment of the present invention would have an assembly with a disperser device of several pointed ends, wherein, in the space around the disperser device of several pointed ends a broad electrical field would form with an increase in air ionization, therefore with an enhanced attraction and enhanced probability of lightning ray discharges. In the most preferred embodiment of the present invention, the rod is energized by an energy source, so the energized rod would increase yet more the electrical field space and ionized air, increasing yet more the probability of attraction and discharge of lightning rays through the rod.

The function of the toroid allows incorporating the Tesla theory to the present invention. The toroid preferably is placed in the inferior portion of the rod. The placement of the toroid determines an imaginary horizontal plane. The toroid because of its circular geometry and completely blunt shape, minimizes the probability of formation of electrical fields and air ionization in the space located below said imaginary horizontal plane. In other words, the electrical field and air ionization occur around the rod pointed end or pointed ends in the superior space that projects out above the imaginary horizontal plane determined by the toroid placement, while below said imaginary horizontal plane the probability of formation of electrical fields and air ionization is minimized. Therefore, with higher probability lightning rays are going to be attracted and discharged by the pointed end or pointed ends, while there is minimal probability that said lightning rays are attracted or discharged by structures located below the space of the imaginary horizontal plane that cross at the toroid level.

The present invention reconciles the high probability of attraction and discharge of lightning rays by the pointed end of the rod, and the minimal probability of attraction and discharge of lightning rays below the level of the toroid, even in case the rod is not energized, for example, when the source that energizes the rod fails or there is no source to energize the rod.

In other aspect of the present invention, the filter system for the electrical discharge is characterized at least by two elements (7), wherein each one of the elements (7) is joined to an isolator (5) preferably with a bracket (8) or with other joint mechanisms, wherein the elements are located vertically and successively from a superior level to an inferior level, wherein a first element (7A) is the most superior, wherein the first element (7A) is directly connected to the rod (1) of the assembly.

In other embodiment of the present invention, the filter system for the electrical discharge is characterized by at least two elements (7), wherein each one of the elements is joined to the isolator (5) preferably with a bracket (8) or with other joint mechanisms, wherein the elements (7) are located successively in spiral from a superior level to an inferior level, wherein a first element (7A) is the most superior, wherein the first element (7A) is directly connected to the rod (1) of the assembly.

In the most preferred way of the present invention the number of elements of the filter is at least three and the disposition of said elements is from superior to inferior in the spiral form, so the spiral form would allow placing more connected elements around the isolator. The elements can also be placed vertically such that an element is directly located below an immediately superior element. The distance between one element and another element is critical so that when there is an electrical discharge, air between the two elements reach optimal ionization, and thus with higher probability a current arc is produced that travels through the air between the two elements. The current arc that travels through the ionized air in the space located between is what defines the plasma effect. Preferably, the distance between two elements is less than 25 centimeters, although it is possible that the plasma effect is produced with bigger distances between two elements. Each current arc between two elements would attenuate the magnitude of the current of the electrical discharge. A filter having more elements more would be current arcs and bigger would be attenuation of the current of the electrical discharge.

While the description presents the preferred embodiments of the present invention, additional changes can be made in the form and disposition of the parts without distancing from the basic ideas and principles comprised in the claims.

EXAMPLES

A device was built that comprises an assembly of a rod with a pointed superior extreme, and a circular toroid connected by radial extensions to the inferior portion of said rod. The inferior extreme of said rod was joined to an isolator. To said isolator was connected a filter system constituted by six elements located along a vertical axis from superior to inferior, wherein the element most superior was directly connected to the rod of the assembly. The filter elements do not have a direct physical connection among them. The distance from one filter element to the next element was 9 centimeters. The elements were connected to the filter with brackets. The most inferior element of the filter was connected to a cable that was further connected to a ground system. At ground level, produced amperage of a current was measured when said current was applied to the rod.

When to the rod was applied an electrical current of 5 to 7 amperes generated by a transformator with voltages of 115 thousand volts at 60 cycles, the measures at ground level of the current oscillate between 54 and 36 microamperes, that, shows a dramatic attenuation of the electrical current.

The invention claimed is:

1. A device to attract, attenuate and dissipate electrical discharges, wherein the device comprises:
   A. An assembly that comprises: A1) a vertical rod, wherein the rod in its superior extreme is pointed; and A2) a circular toroid that is connected by radial extensions to the rod;
   B. An isolator that supports the inferior extreme of the rod of the assembly; and
   C. A filter system for the electrical discharge, wherein said system comprises at least two elements, wherein each one of the elements is joined to the isolator, wherein the elements are placed successively from a superior level to an inferior level, wherein a first element is a most superior, wherein the first element is connected directly to the assembly rod;

wherein between two successive elements of the filter system, when there is an electrical discharge, a plasma effect is induced due to ionization of molecules of gases in air, wherein a most inferior element of the filter system is connected to ground by mean of a cable.

2. The device of claim 1, wherein the assembly comprises A1) the circular rod; A2) a disperser with multiple pointed ends on the superior extreme of the vertical rod; and A3) the circular toroid that is connected by radial extensions to the rod.

3. The device of claim 1, wherein the assembly comprises the rod, wherein the rod is energized by an energy source, wherein the energy source is an electrical line.

4. The device of claim 1, wherein the assembly comprises the rod, wherein the rod is energized by an energy source, wherein the energy source is a elevator transformator.

5. The device of claim 1, wherein the filter system for the electrical discharge comprises at least said two elements, wherein each of the elements is joined to an isolator, wherein the elements are located vertically and successively from a superior level to an inferior level, wherein the first elements is the most superior, wherein the first element is connected directly to the assembly rod.

6. The device of claim 1, wherein the filter system for the electrical discharge comprises at least said two elements, wherein each one of the elements is joined to the isolator, wherein the elements are located successively in spiral from a superior level to an inferior level, wherein the first element is the most superior, wherein the first element is connected directly to the assembly rod.

* * * * *